(12) United States Patent
Ackman

(10) Patent No.: US 11,143,157 B1
(45) Date of Patent: Oct. 12, 2021

(54) WATER MOTOR

(71) Applicant: Terry E. Ackman, Jefferson Hills, PA (US)

(72) Inventor: Terry E. Ackman, Jefferson Hills, PA (US)

( * ) Notice: Subject to any disclaimer, the term of this patent is extended or adjusted under 35 U.S.C. 154(b) by 175 days.

(21) Appl. No.: 16/844,208

(22) Filed: Apr. 9, 2020

(51) Int. Cl.
*F03B 7/00* (2006.01)
*F03B 17/06* (2006.01)

(52) U.S. Cl.
CPC .............. *F03B 7/003* (2013.01); *F03B 17/06* (2013.01)

(58) Field of Classification Search
CPC ........... F03B 7/003; F03B 17/06; F03B 9/005
See application file for complete search history.

(56) References Cited

U.S. PATENT DOCUMENTS

| 463,583 A * | 11/1891 | Ricketts | F03B 17/02 60/640 |
| 8,297,055 B2 * | 10/2012 | Ackman | F03B 7/003 60/640 |

* cited by examiner

*Primary Examiner* — Julio C. Gonzalez
(74) *Attorney, Agent, or Firm* — Carothers & Carothers

(57) ABSTRACT

A water motor which includes a tubular tipping lever arm open on both ends and a central water fill port, and a central fulcrum pivotally supporting the tipping lever arm for see-saw tipping thereabout. Temporary containment vessels are provided on opposite ends of a work lever arm and positioned under each open end of the tipping lever arm to receive water flowing from a respective one of the open ends of the tipping lever arm. A drain valve is provided in each container for respectively draining water from the containers and the drain valves are respectively opened when a respective one of the containers is in a minimum height position. A directional flow control lever depends downwardly from the tipping lever arm and protrudes between spaced lever control stops which cyclically engage and reverse the see-saw tipping of the tipping lever arm and also provides resultant draining of a respective of the containers with the push rod engagement force of the lever control stops.

8 Claims, 6 Drawing Sheets

WATER MOTOR

FIELD OF THE INVENTION

The present invention pertains to water motors; more specifically, devices that derive kinetic energy from the potential energy of water weight as a result of gravity.

BACKGROUND OF THE INVENTION

The present invention pertains to improvements in the present inventor's invention disclosed in U.S. Pat. No. 8,297,055, which issued on Oct. 30, 2012.

It is an object of the present invention to provide a more efficient and effective, yet less expensive, water motor that is easy to maintain, and wherein the derived kinetic energy can be utilized to generate electricity, power a pump, or drive other operations, such as a compressor, utilizing low head. For example, water falling from a height of seven feet, more or less. The present invention has the objective to take advantage of falling water that could be accessed from a large variety of sources, such as: natural streams, discharges from flood control structures (e.g., dams, locks, levies), storm runoff, snow melt, mine effluent, power plant cooling water, seasonal irrigation discharges, and other infrastructures, such as, water and waste water lines.

Such a water motor needs to be efficient, small in size and lightweight so that it can be located locally and easily in any of the aforementioned situations.

SUMMARY OF THE INVENTION

The water motor of the present invention is capable of efficiently and effectively taking advantage of such low head water flow supplies utilizing a compact mechanism which is more efficient than the water motors of the prior art. Furthermore, design simplicity and variability of construction materials allows for ready transport and re-assembly at alternative or more desirable locations, as opportunities may arise.

The water motor of the present invention comprises a tubular tipping lever arm having opposed open ends and a central water fill port positioned above a central fulcrum pivotally supporting the tipping lever arm for seesaw tipping about the central fulcrum. A container is positioned under each open end of the tipping lever arm to receive water flowing from a respective one of the open ends of the tipping lever arm, and a drain valve is provided in each container for respectively draining water from the containers. The containers are mounted respectively to opposite ends of a work lever arm having a central fulcrum supporting the work lever arm for seesaw rocking thereabout to alternately position the containers at low and high height positions. Drain activation members respectively engage the drain valves for opening the drain valves when a corresponding respective one of the containers is at a low height position. A directional flow control lever depends centrally downward from the tipping lever arm. The distal end of this flow control lever protrudes between two spaced lever control stops. The spacial relationship between the distal end of the directional flow control lever and the spaced lever control stops is arranged and dimensioned for engagement therebetween to thereby cyclically reverse the seesaw tipping, and thereby the flow direction, of the tipping lever arm with resultant cyclical draining of respective of the containers with the engagement of the directional flow control lever with one of the lever control stops. This seesaw reversal occurs when one of the containers attains a low height position and the other container simultaneously attains a high height position.

This results in a significant improvement of the inventor's original invention disclosed in US U.S. Pat. No. 8,297,055 in that its required use of floats positioned in each of the containers, together with their upwardly extending rigid lifting rods for engaging respective ones of the opposed lever arm ends for thereby cyclically reversing the seesaw tipping of the lever arm, is eliminated and substituted with the downwardly depending central tipping lever arm which has its distal end protruding between the two spaced lever control stops. This provides a much more economical construction which is also more reliable in operation.

The apparatus of the present invention, as with the inventor's prior water motor, uses torque to redirect or reverse flow direction. However, the apparatus of the present invention uses the alternating up and down rotational movement (mechanical torque) of the working lever arm as the energy source to redirect flow direction of the tipping lever arm, rather than using buoyancy generated torque.

With the apparatus of the present invention mechanical torque is created by the up and down or seesaw motion of the work lever arm. The apparatus of the present invention utilizes drain activation members for engaging the drain valves for thereby opening a respective one of the drain valves when a corresponding respective one of the containers is at its lower height position to drain this respective one of the containers. This drain activation member may take on the form of flexible lines connected to the tipping lever arm as disclosed in the inventor's prior patent. However, an improved drain activation member is disclosed herein in the form of two equally spaced protrusions or push rods which are respectively mounted under opposite ends of the work lever arm. These upwardly extending pushrod protrusions are positioned respectively under each container and they are dimensioned, aligned and arranged for respectively engaging the drain valves in the containers to open the drain valves when a respective one of the containers is in the lower height position. This places the drain activation members at a low position on the water motor where they are easily accessed for any repair requirements and provides drain activation members which are less complex in construction.

The directional flow control lever depending downwardly from the tipping lever arm may be provided with a reservoir at its distal end, which acts as a centralized counterweight.

The work lever arm tips back and forth in a seesaw manner due to a process of catch and release of the water entering and draining from the containers. This process is facilitated with a mobile and non-centralized counterweight provided in the reservoir container in the downwardly depending work lever arm. The weight of a full lowered reservoir container (counterweight) must be less than the full raised weight of the raised opposing container in order to create work lever arm movement in one direction (of rotation) at a time. This rotational movement created by an imbalanced work lever arm simultaneously applies torque and controls the movement (with push rod control stops) of the directional flow control lever and redistributes weight forces across the work lever arm and across the fulcrum. This transfer of weight across the fulcrum represents the conversion of a load force to an effort force with respect to the movement of the work lever arms and maximum torque generation.

In a more efficient form, the water motor of the present invention is constructed whereby the containers are mounted to opposite ends of a work lever arm that has a central fulcrum supporting the work lever arm for seesaw rocking about the fulcrum point, and a workload is connected to the rocking work lever arm, such as, a turning shaft or reciprocating pistons, for performing work generated from the rocking work lever.

In order to make this combination more effective and more efficient, a pair of magnetic lever arm holders are secured to the ground or motor frame beneath the lever arms and respectively engage the lowered end of the working lever from beneath as it comes to rest. the magnetic arm holders provide adequate downward force to permit the raised container to completely fill before the magnetic bond is disengaged by the force created by the potential energy of the filled raised container. The instant release of the full container permits the fall of the raised and weighted work lever about the fulcrum and the creation of harvestable energy by piston or shaft.

The rapid and complete counterweight transfer across the fulcrum nearly doubles the harvestable water weight (of the full temporary storage container) secured to the falling work lever arm while simultaneously removing weight from the opposing and rising work lever arm, which in turn creates an imbalanced work lever arm and enhances movement and momentum of the falling work lever arm as a result of the cyclic transfer of internal water mass back and forth across the fulcrum.

The enhanced movement and momentum mentioned above also enhances torque production by cyclically contributing its own reservoir weight to be reharvested along with the combined weight of the falling (full) container and weighted work lever arm. This internal and sustainable and raised water weight contribution is the result of the internal water weight being lifted from the lowered storage position (by opposing incoming water weight) to flow over the height of the fulcrum and then falling into the descending and empty reservoir secured on the descending and opposing end of the work lever arm.

In situations where the tubular tipping lever arm must be shorter than desired, the open end of the tubular lever arm may be provided with dam walls in order to provide a small amount of water reservoir build up in each end of the tipping lever arm.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

DETAILED DESCRIPTION OF THE PREFERRED EMBODIMENT

Figure 1:
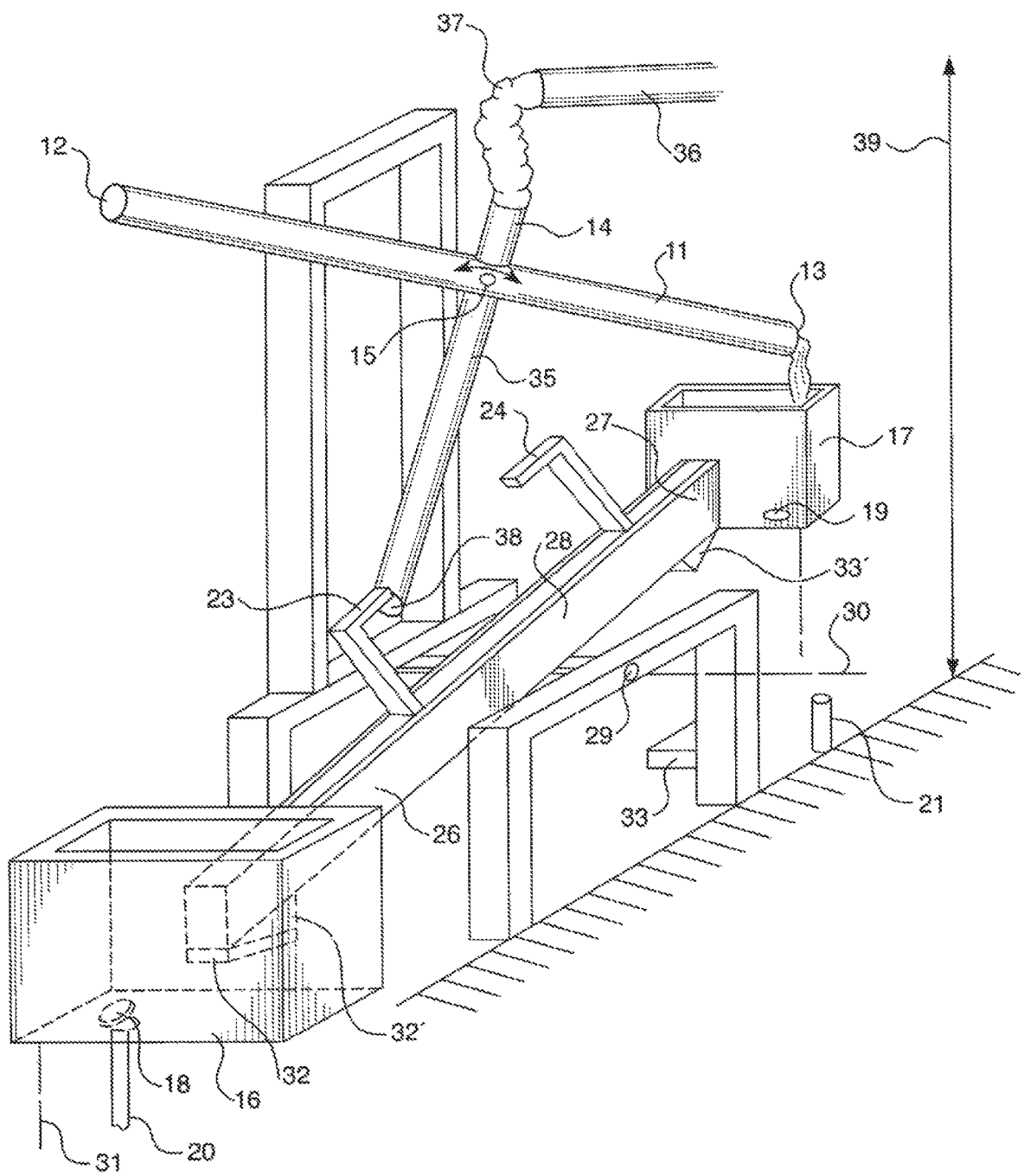
FIG. 1 is a perspective schematic drawing illustrating one embodiment of the water motor of the present invention.

Referring to FIG. 1, a pair of magnets 32 and 33 are respectively secured to the ground or motor frame, beneath the steel working lever arm 28. When lowered the bottom of the lowered end of the working lever arm 28 engages a specified amount of magnetic force from magnet 32 or 33 to hold the work lever arm 28 in a down and tilted position until enough potential energy in the raised container provides the necessary force to disengage. To maximize contact and magnetic force being applied, a steel wedge 32' and 33' of a specified angle is secured to the bottom ends of the working lever arm 28 and positioned relative to the stationary anchored magnetic arm holder magnets 32 and 33 which are anchored in the ground.

Each container is provided with a drain valve 18 and 19 respectively for draining water from container 16 or container 17. Drain activation members in the form of upwardly extending protrusions 20 and 21 are each of a predetermined length and respectively positioned and aligned under drain valves 18 and 19 for engaging and opening the drain valves when a corresponding one of the containers 16 and 17 is in a minimum or low height position. In the figure, container 16 is in the low height position and drain valve 18 is therefore open, draining container 16.

A directional flow control lever arm 35 depends centrally downward from tipping lever arm 11 and has a distal end 38 protruding downwardly between raised and spaced push rod lever control stops 23 and 24 secured to the work lever arm 28. The spacial relationship between the distal end 38 of directional flow control lever arm 35 and the push rod lever control stops 23 and 24 is arranged and dimensioned for respective engagement therebetween to accordingly cyclically reverse the seesaw tipping, and thereby the flow direction of the tipping lever arm 11 with resultant cyclical draining of respective of the containers 16 and 17 with the engagement of the directional flow control lever 35 with one of the lever control stops 23 and 24.

The containers 16 and 17 are respectively mounted to opposite ends 26 and 27 of work lever arm 28, which has a central fulcrum 29 and which is a pivot point supporting work lever arm 28 for seesaw rocking thereabout. A work load, such as oscillating work shaft 30, or vertically disposed work pistons 31 shown in dashed outline, are connected to rocking work lever arm 28 for performing work generated from the rocking motion of work lever 28.

Directional flow control lever arm 35 positioned under the central fulcrum 15 of tipping lever arm 11 also serves as a reservoir counterweight by providing a counterweight reservoir in its distal end 38.

Flowing water from a water source is directed through pipe 36 and flexible hose 37 into central water fill port 14 of tipping lever arm 11 at the elevation indicated by the head of elevation change arrow 39. Although the tipping lever arm 11 is here shown as tubular piping, it may be constructed instead of flumes. Accordingly, when the term "tubular" is used, it is intended to indicate any suitable trough mechanism for flowing the water.

Figure 2:
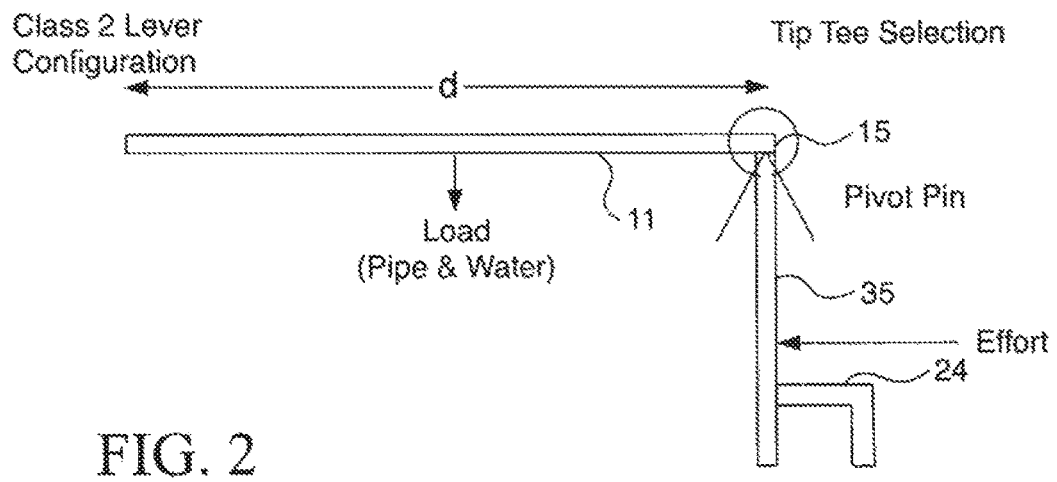
FIG. 2 is a schematic diagram illustrating the forces applied to the tipping lever arm of the water motor shown in FIG. 1 as a class 2 lever system.
Figure 3:
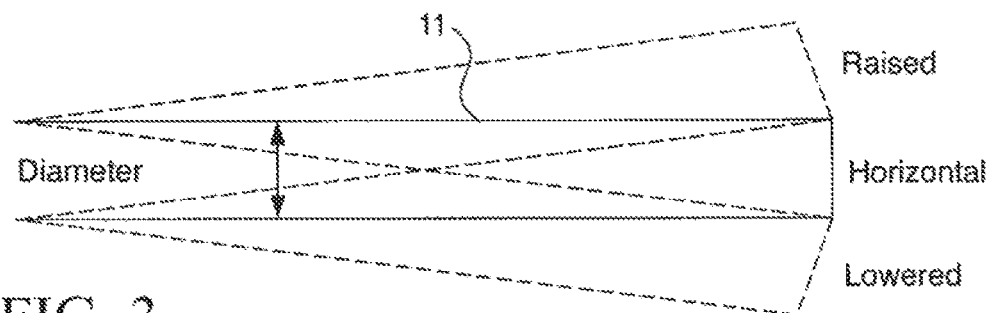
FIG. 3 is a schematic diagram illustrating the minimal tipping distance required by the buoyant force to be approximately equivalent to the pipe diameter.

The tipping lever arm 11 can be defined as a class 2 lever system as depicted in FIG. 2. It contains two balanced horizontal arms with outlets 12 and 13 on each end, an inlet pipe at the water fill port 14 and a counterbalance chamber provided by the reservoir in directional flow control lever arm 35. Without the intervention of the applied push rod force of either lever control stops 23 or 24, tipping lever arm 11 would discharge water in two directions simultaneously at ends 12 and 13 due to the balanced symmetry of the design. However, if tipping lever arm 11 is tipped a vertical distance of at least the pipe diameter to one side or the other, the total flow will discharge from the lower end, given an appropriate design of pipe diameter and flow rate as schematically illustrated in FIGS. 3 and 4.

Figure 4:
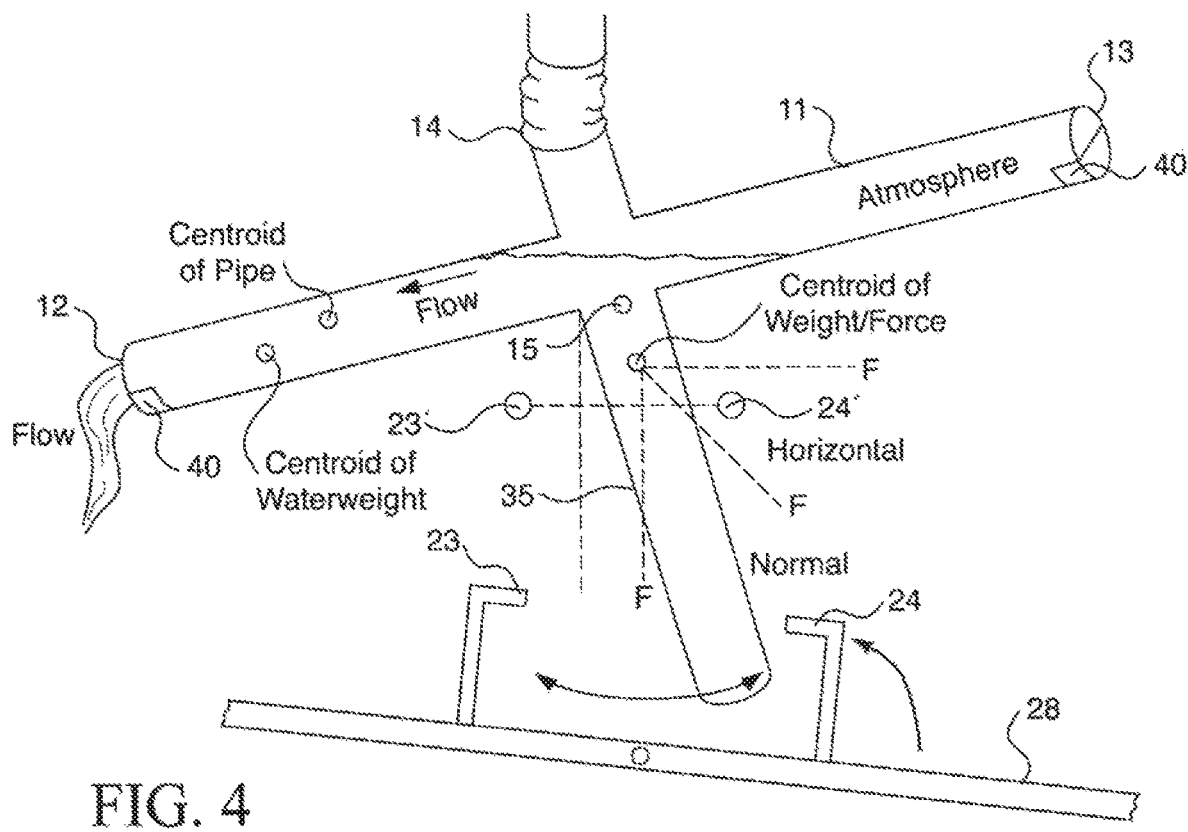
FIG. 4 is a schematic illustration illustrating the forces within the tipping lever arm of the water motor shown in FIG. 1 that must be overcome by the buoyant force.

The tubular tipping lever arm 11 of FIG. 4 is provided at its opposite ends 12 and 13 respectively with bottom half caps or dam walls 40. Dam walls 40 are not required in all situations, but are effective in situations where a shorter tipping lever arm 11 must be employed, thereby providing the accumulation of more water in each respective end of tipping lever arm 11.

A portion of the force created by the movement of the work lever 28 and orchestrated engagement of the lever control stops 23 or 24 with lever control arm 35 is applied internally within the system as the means to raise and lower the ends 12 and 13 of the tipping lever 11 and reverse flow direction. Furthermore, the same force created by the movement of the work lever is simultaneously applied to the opening of the corresponding valve 18 or 19 in the bottom of the lowered respective container 16 or 17.

As the lever control stop 23 or 24 raises the corresponding end 13 or 12 of tipping lever arm 11, the flow direction of lever arm 11 is reversed, the lowered end 12 or 13 is raised and the upwardly extending protrusion 20 or 21 engages the corresponding float drain valve 18 or 19 and allows the stored water to discharge as indicated at the bottom of container 16 in FIG. 1. Thus, this action simultaneously allows the weight or load from the lowered side of work lever 28 to drain, redirect flow of water, and begins to fill the empty raised container on the opposite side of fulcrum 29. The float drain valve 18 or 19 remains in the open position until the raised arm 12 or 13 of tipping lever arm 11 is lowered by the same process, beginning on the opposite side of the tipping lever arm 11. This closes the float drain valve 18 or 19 as flow is once again redirected back to the emptied container 16 or 17. It is through this ability to transfer and discharge fluid between independent storage containers 16 and 17, coupled with the oscillating elevation change of the lower work lever system that permits forces of water weight to be generated for conversion into either work or power through mechanical connections 30 or 31.

The specified and combined weight of both the filled counterbalance reservoir and the lever control arm 35 is used to provide a centralized downward force beneath the fulcrum as a counter to the weight force existing in the lowered, water-flowing tipping lever arm 11 (FIG. 4). If placed in a horizontal position, the downward force of the centralized counterbalance mentioned above maintains a horizontal position and simultaneously creates discharge from both ends. If placed in a tipped position, the rotational tendency (clockwise or counter clockwise) of a lowered tipping lever arm 11 is controlled by the weight ratio of both the tilted tipping lever arm 11 and that of the lever control arm 35. If the vertical weight of the lever control arm 35 was greater than the combined (water and pipe) weight of a tilted tipping lever arm, the rotational tendency of the lever control arm will be downward towards the center of the work lever arm. Alternatively, if the weight balance was reversed and the tipping lever arm weighs mom than the lever control, then the rotational tendency of the lever control arm 35 will be outward towards the respective ends of the work lever arm.

The respective push rod lever control stops 23 and 24 may also serve as lever stops to oppose the rotational tendency of the distal end 38 of the lever control arm 35. Alternatively, lever control stops 23' and 24' in FIG. 4 may be added to the fulcrum or tipping lever arm support frame and secured a specified distance on both sides of the fulcrum to control the rotational arc of the lever control arm 35.

Figure 5:
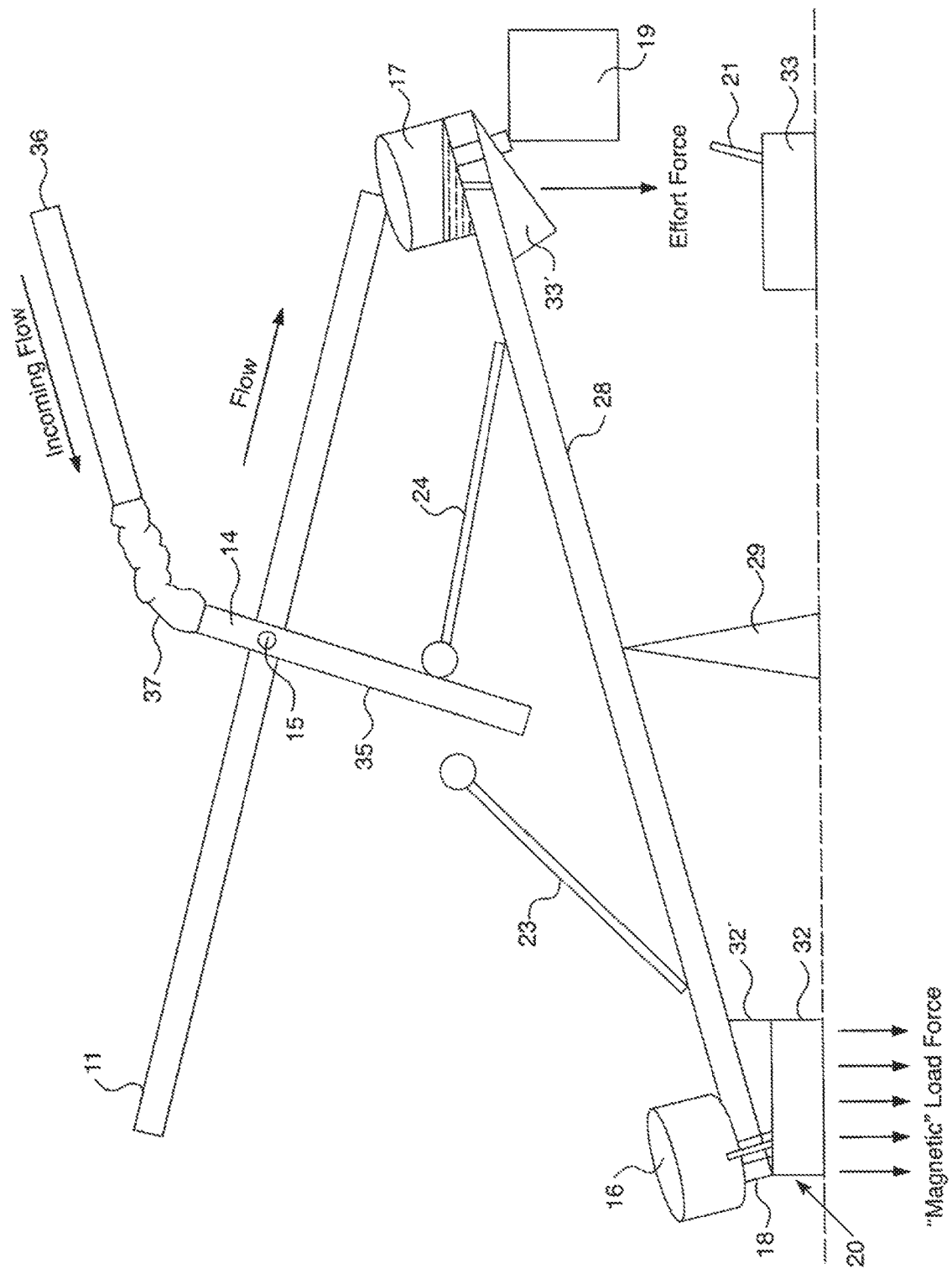
FIG. 5 is a schematic diagram illustrating the water motor of the present invention as utilized in a low water head elevation.

The lever control arm 35 protruding downward coupled with the movement of the lever control stop 23 or 24 in FIG. 5 creates a class 2 lever configuration, as shown in FIG. 2. This configuration allows for the lever control arm 35 to be considered as a force magnifier and as an improvement due the energy savings of reduced torque applied by the lever control stops 23 and 24 secured to the work lever arm. The counterbalance weight of the lever control arm 35 mentioned above may also include the use of solid materials of specified weight without the use of liquid weight or reservoirs.

The movement of the tipping lever arm 11 is controlled by the movement of the work lever arm 28 and the attached lever control stops 23 and 24. However, the placement and use of the lever control stops depends on the weight ratio of the tilted tipping lever arm 11 and the tilted lever control arm 35. If the greater weight is that of the tilted tipping lever arm 11, then the rotational tendency of the perpendicular lever control arm 35 will be outward from center. In this case, lever control stops 23' and 24' in FIG. 4 are added and secured to the fulcrum frame to contain outward movement of the lever control arm 35, and permit disengagement by the respective lever control stop.

In the opposite case, when the lever control arm 35 is of greater weight than the tilted tipping lever arm 11, the rotational tendency of the lever control arm 35 will be downward toward center. Unlike the former case discussed above, lever control stops 23' and 24' are not required. The lever control stops 23 and 24 serve a dual purpose of both pushing and containing (as a stop lever) the lever control arm 35 and maintains constant engagement of the lever control arm 35 on the respective sides of the fulcrum.

Improvement is achieved in efficient weight collection and cycle time. The movement of the working lever arm 28, which controls the movement of the tipping lever arm 11, is slow at first and then rapidly accelerates as the result of gravitational force and redistribution of weight across the falling work lever arm 28. Considering the latter case of constant engagement of the lever control arm 35 by the lever control stops, the water discharge rate from the lowered end of the tipping lever arm 13 slowly diminishes, then rapidly ceases to flow as the tipping lever arm is raised. The initial slow movement of the work lever arm and diminishing flow rate from the lowered tipping lever arm reduces the cycle time of the water motor since it takes longer to fill the raised/falling temporary storage container 16 or 17 than it would if the full flow rate was continuous throughout the filling and descent of the previously raised temporary container 16 or 17.

Considering the former case of disengagement mentioned above, the push rod lever control stops 23 and 24 need to partially engage the lever control arm 35 and then disengage contact when the lever control arm 35 is pushed beyond the vertical plane of the fulcrum, which simultaneously creates an imbalance within the tipping lever arm 11 (FIG. 4) and provides weight force to power the remaining rotational travel distance that is defined by the placement of (alternate) lever control stops (FIG. 4, 23' and 24') located on the fulcrum frame. The travel distance powered by an imbalance of shifting water weight within the lever control arm, rather than the lever control stops, permits partial movement of the work lever arm 28 prior to engagement of the respective push rod and lever control arm 35. Consequently, the full discharge rate is maintained for a longer time period, and filling the temporary containers 16 and 17 more quickly and improving cycle time.

Due to the cyclic redistribution of forces within the tipping lever arm crossing back and forth over the fulcrum, the tipping tee lever arm 11 oscillates back and forth, exhibiting the characteristics of a class 1 and class 2 lever. A class 1 lever is defined as having an effort force(s) on one side of the fulcrum and a load force(s) on the opposing side of the fulcrum as illustrated in the tilted position. A class 2 lever is defined as having the effort and the load force(s) on the same side of the fulcrum but applied in opposite directions (FIG. 2).

With reference to FIG. 5, the amount of work produced can be increased by increasing the force (f) or volume (weight capacity) of containers 16 and 17. The magnetic force required of magnets 32 and 33 is a direct function of the volume capacity of the containers. For example, the weight of water in a circular containment vessel can be increased exponentially by increasing the diameter without increasing vessel height; however, additional magnetic force is required to maintain the position of the raised container. The container height is directly related to the tipping lever arm 11, such that the tipping lever arm 11 when in lowered position must be in a higher position than the height of the top of the receiving container 16 and 17.

The rotational distance or operating angles of both levers, tipping lever arm 11 and work lever 28, are important to operational interactions and effectiveness of the two interacting lever systems as well as energy (torque) output. In the case of the tipping lever arm 11, the angle of rotation is minimized and related to the pipe diameter (see FIG. 3), which permits minimal vertical movement of the discharge ends 12 and 13 while providing effective flow relative to receiving apparatus or containers 16 and 17 secured to the ends of the work lever 28. The rotational angle of the work lever 28 (coupled with secured apparatus) is maximized by fulcrum configuration 29 and 15 of FIG. 5, which includes the spatial distance between fulcrums 15 and 29, the ground height of the lower fulcrum and the desired energy (torque) output.

Also, with the addition of recording time and cyclic filling of temporary storage containers, the water motor may also serve a dual purpose as a flow meter and may use either lever system; tipping lever or work lever, to engage the mechanical counting device.

The empty container 16 or 17 is placed in a raised position to receive flow while magnetic force holds down or secures the lowered end of the work lever arm 28 as the raised container fills thus providing a resistive magnetic force. The tipping lever arm 11 is positioned to direct flow into the raised end of the container 16 or 17 and represents the increasing force to raise and disengage the lowered end of the work lever arm 28 located beneath the working lever arm 28.

The footprint of the work lever system incorporating the work lever 28 is relatively small, for example, 5 feet in width, 20 feet in length and 10 to 20 feet high with no atmospheric emissions. The geometry of the system, including the containers 16, 17, 32 and 33, the work lever 28 and the tipping lever arm 11, is flexible and can be designed to minimize elevation requirements and maximize output. Consequently, there are many different design configurations of the containers 16, 17, 32 and 33 and of the tipping lever arm that can be integrated on the lower working lever 28.

Step 2: As the water weight of the lowered container 16 or 17 is discharged through it's flapper value 18, which is opened by the stationary push rod 20 or 21 secured beneath the container, the holding force created by the magnetic arm holder remains. As the raised container 16 or 17 reaches weight capacity, it also has created enough potential energy to disengage magnetic forces of magnet 32 or 33 and permits a descent that is accelerated by gravity.

Finally, the rate at which torque can be created is a function of the flow rate into the raised container 16 or 17 from the tipping lever arm 11. The power generation by lever forces of containers 16 and 17 is maximized when these weight loads are located at or near to at the distal end.

As previously described, the raised container 16 or 17 is filled with water entering the tipping lever arm 11 and the flow direction and discharge are activated by movement and engagement of control lever 35 with one of the push rod lever control stops 23 and 24. To better understand how the water motor work operates, a brief description of a complete cycle follows.

The work lever arm tips back and forth in a seesaw like manner due to the process of catch and release of water weight entering and draining from containers. This process is improved with the use of magnetic force being applied as a stationary counterweight beneath the containers 16 and 17 at the distal end of the downwardly depending work lever arm 28. The improvement is the result of more force being created due to the instant release of a magnetic load force as a greater effort force (water weight) breaks the bond of the magnetic field when at its maximum height (greater distance of travel with maximum weight load), as well as, creating additional momentum. The elimination of the water weight transfer across the working lever arm, as described in prior art, improves the efficiency of the water motor.

The water motor of the present invention is considered to be the first modern large scale, low head, lever based water motor that combines intrinsic leverage and water weight to create significant amounts of torque through catch and release water management.

Figure 6:
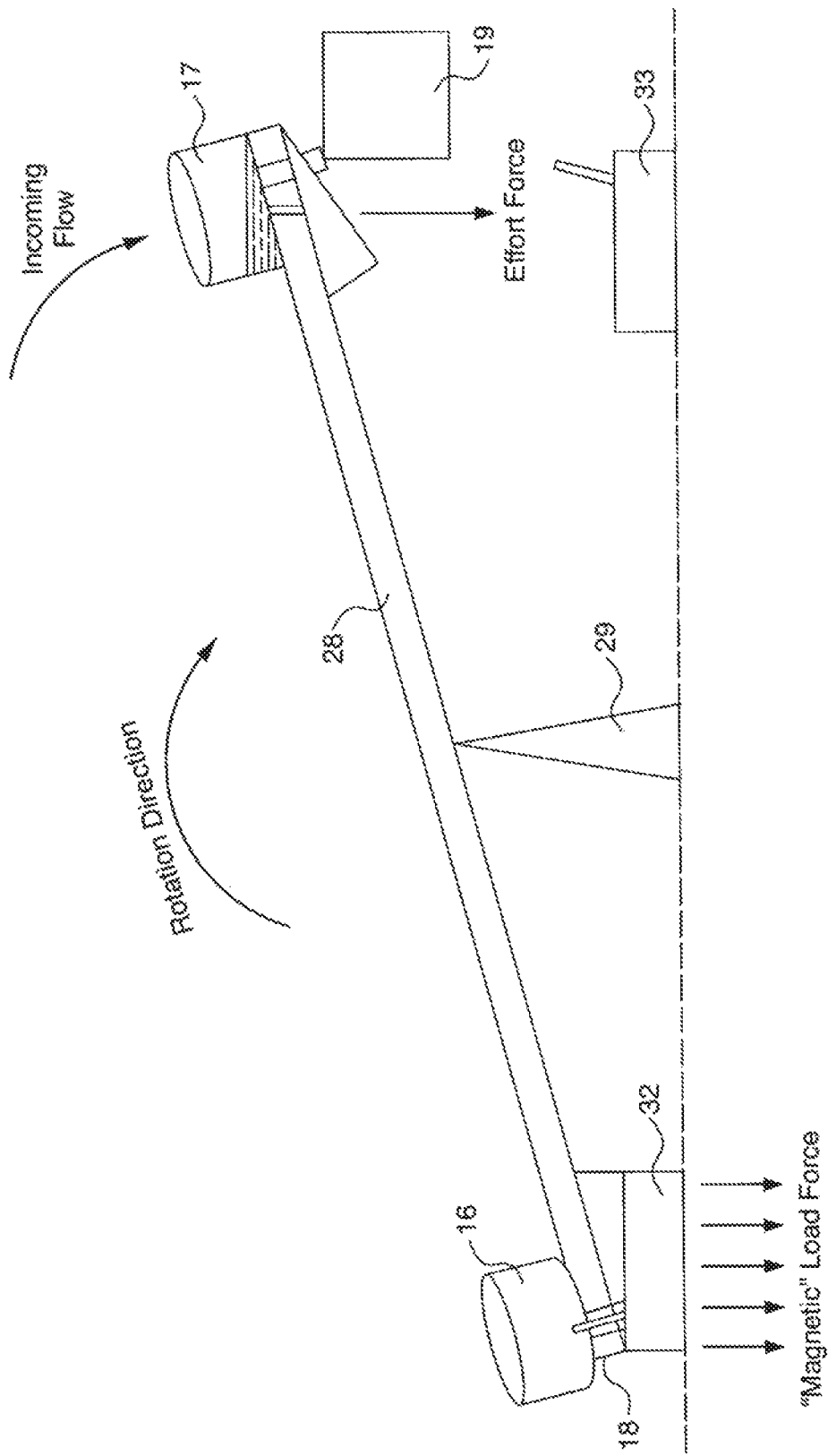
FIGS. 6. 7 and 8 are diagrammatic views illustrating the sequential steps of operation of one embodiment of the present invention

A pair of magnets, described as arm holder magnets 32 and 33 are respectively secured to the ground or motor frame, beneath the steel working lever (FIG. 5) and serve as a counterbalance force within the motor. To maximize contact and the magnetic force being applied, steel wedges 32' and 33' of a specified angle are secured to the bottom of the working lever arm 28 and positioned relative to the stationary arm holder magnets 32 and 33, which can be anchored in the ground or secured on the motor frame. As one end is lowered, the bottom of the working lever arm 28 engages a specified amount of magnetic force from magnets 32 and 33 which aw designed to hold the work lever arm 28 in a down and tilted position until a designated (Effort Force) is collected in the raised and filling container 17 (FIG. 6).

Figure 7:
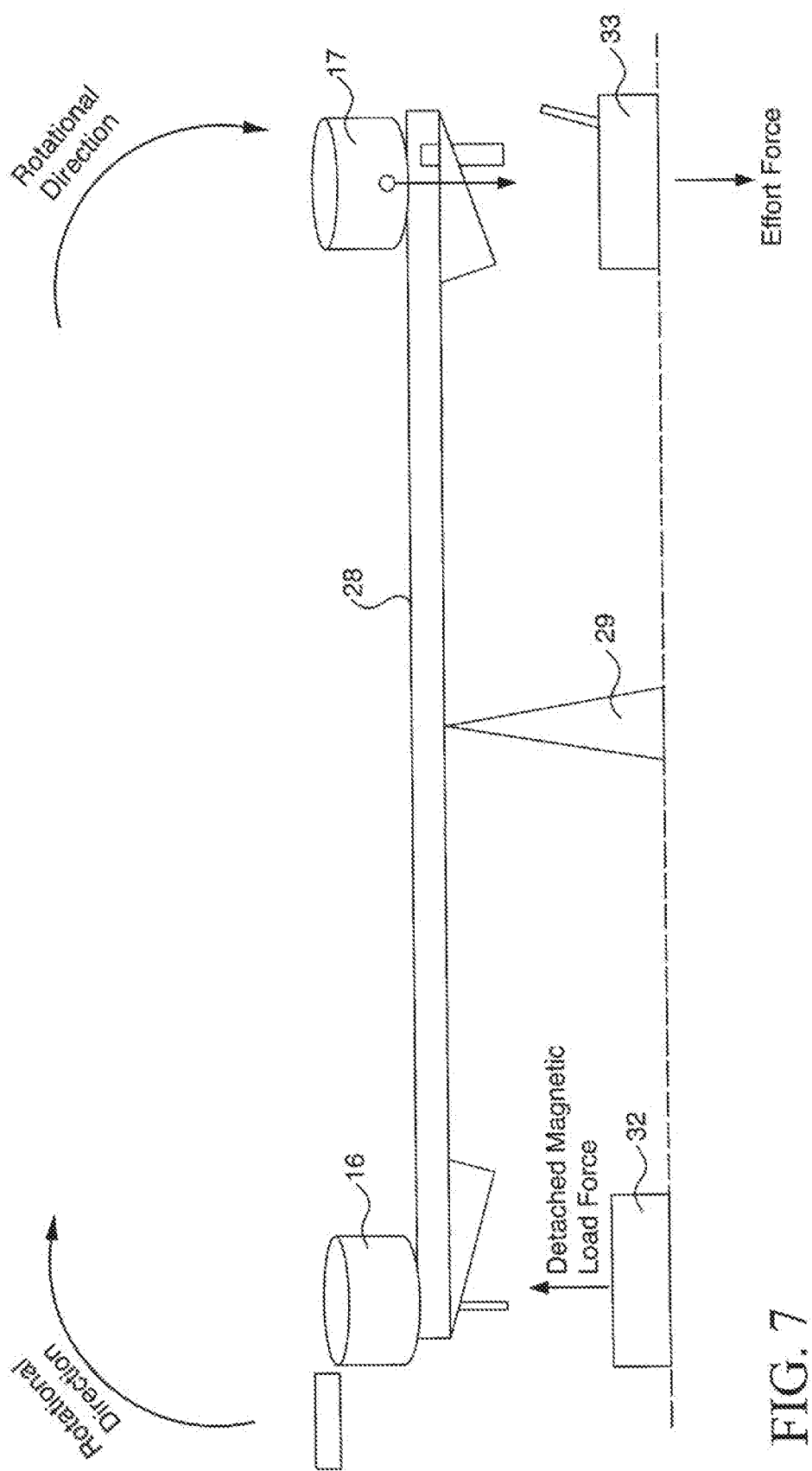
Figure 8:
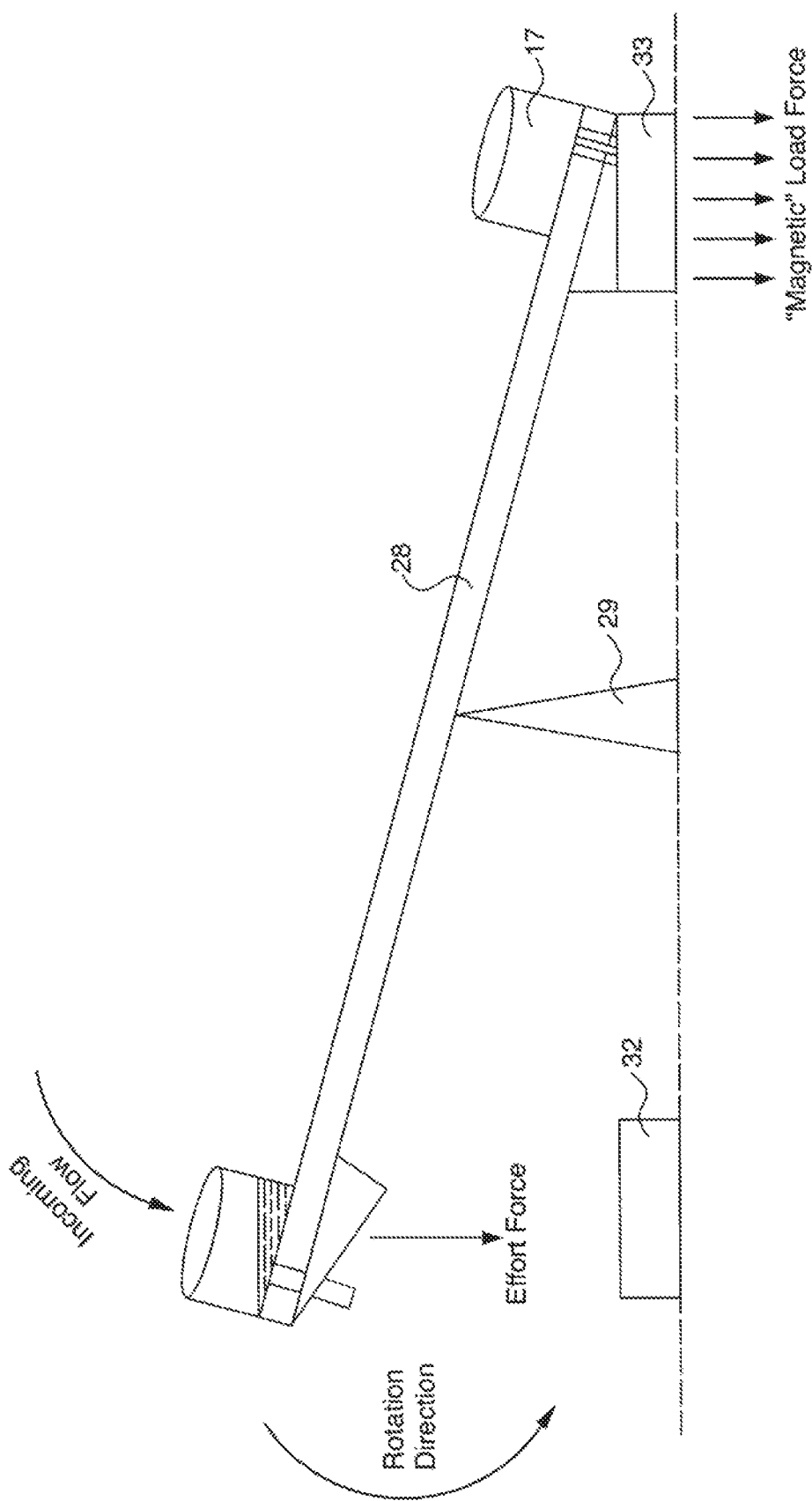

As the raised container reaches design capacity, the Effort Force disengages the lowered end of the work lever arm from the counterweight or magnetic Load Force of magnets 32 and 33 (FIGS. 6 and 7) and permits the weighted raised container 16 or 17 to free fall about the fulcrum from its maximum height coupled with its maximum weight or force available for harvest or energy conversion by shaft or piston. As the work lever arm 28 rotates it simultaneously redirects flow from tipping lever arm 1 and control lever 35 when directional flow push rods 23 and 27 (FIG. 5) are engaged and converts energy with a piston or shaft, and becomes re-engaged with the magnetic field of the opposing lowered magnetic lever arm holder magnet 32 or 33 as it comes to rest (FIG. 8).

The water weight of the lower container 16 or 17 is discharged through its flapper valve 18, which is opened by the stationary push rod 20 or 21 (FIG. 5) secured beneath the container. However, the holding force created by the arm holder magnet remains as the newly raised empty container 16 or 17 begins to fill.

The torque created by the work lever 28 is maximized by concentrating both temporary and permanent weight loads (containers) the maximum distance from the fulcrum in order to maximize mechanical advantage (of weighted ends) during the power stroke which occurs when the movement of the combined weight of the falling lever is accelerating through the horizontal position and landing in the lowered resting position. Alternatively, the power stroke occurs during the second half the work lever's falling rotational arc, or from mid-point to resting position. It is important to note that the initial effort force (required for raising a lowered end of the work lever to the horizontal) decreases as center of mass for the lighter weight work lever arm rotates up and approaches the vertical. At mid-cycle or at the horizontal, both (the rising and the falling) ends of the work lever are experiencing the same growing gravitational acceleration and angular momentum created by the falling imbalanced weight load on the work lever 28 (FIG. 6).

This rotational movement of the weighted end of the work lever arm 28 about the fulcrum 29 is akin to a common hammer being used to strike a nail, which in turn the hammer performs as a class 3 lever. Note the same hammer, however, when used to remove a nail with the claw performs as a class 1 lever. The work lever cycles between the two common lever classes (1 & 3); depending upon the location of stationary and mobile forces and which side of the fulcrum they are acting upon. The work lever 28 is performing as class 1 lever at the beginning and end the Michael Cycle when the applied water loads of the temporary storage containers 16 and 17 are on opposing sides of the fulcrum and are either discharging or gaining weight. It is recognized that as all water weight crosses the work lever and fulcrum to the falling side, the empty raised temporary container 16 or 17 simultaneously begins filling and adding water weight to the raised end of work lever which in turn begins the transformation of the work lever back into a class 1 lever. The small amount of weight added to the opposing raised end of the work lever is considered to be negligible during the rapid movement of the power stroke, in which there are only seconds to add flow (gpm) to the raised container 16 or 17.

The work lever arm (attached to the fulcrum)cyclically and briefly performs as a class 3 lever, which is a force multiplier (relative to work lever arm length from fulcrum to end and location of acting forces), during the power stroke (mentioned above). Work lever length (r) is shown as the force (F) multiplier in the rotational torque (T) equation: T=F×r×sine (theta). The angle theta only represents the angle of movement during the power stroke, which in turn represents half of the total rotational travel distance by the end of the work lever as it moves from the horizontal downward to the lowered resting position.

Force (F) is equal to mass (m) times acceleration (a) or F=ma; however, acceleration (a) is equal to velocity (v) over time (t) and permits the force (F) equation to be re-written as: F=m×v/t. If both sides of the equation are multiplied by the time (t), the force equation then becomes Ft=mv. As a result, force times time (t) equals momentum (m v). For example, if a 15 Newton force to the right is applied to an initially stationary object for 3 seconds, it will have a momentum of 45 kg m/s to the right. Momentum also doubles when velocity doubles. Similarly, if two objects are moving with the same acceleration, one with twice the mass of the other also has twice the momentum. Since the gravitational acceleration (ag) which acts on the work lever arm 28 is constant (32.17 ft/sec$^2$), the magnitude of torque created by the work lever can now be easily manipulated by the addition or subtraction of mass (m) (solid and liquid) coupled with strategic placement of these load forces on the lever arm relative the fulcrum.

It is important to understand that momentum (p) is a vector measurement. Momentum is in the same direction as velocity and is calculated as mentioned above. Most importantly, it is an indication of how much force is needed to stop the falling weighted and accelerating work lever arm, or alternatively, how much energy conversion can be accomplished in stopping the momentum of the falling and weighted and force multiplying work lever arm by using pistons or shaft turning or some other useful mechanical manner.

The following analogy is presented to better understand momentum and its application by the water motor. In a game of egg toss, an egg is thrown and hits your hand with a momentum of 5 kg m/s, the force it applies to hand depends on the time it takes for your hand to absorb the momentum. If you hold your hand very rigidly to make the egg stop in a very short period of time, the egg exerts a high force on your hand, for example 100 N for $\frac{1}{20}^{th}$ of a second. However, if you let your hand 'give' and extend the amount of time it takes to absorb the momentum, the egg exerts a smaller force on your hand, e.g. 10 N for ½ a second.

The momentum of the egg represents the momentum of the falling weighted work lever arm rotating about its fulcrum. Without your hand or mechanical device to stop the end of the falling work lever, the maximum force or torque that can be created by the water motor 10 (of specific dimensions) is exerted on the ground (without useful energy conversion) with an unobstructed pathway. However, with a mechanical device placed between the ground and the end of the work lever arm, the force of the falling work lever may be harvested near the height of the fulcrum (or lower) for the purpose of converting torque into alternative forms of energy, such as compressed air and electricity. As an example, hydraulic pistons (which fundamentally convert pressure and movement into useful work) may be employed beneath both lever ends as the means to convert the generated force of the work lever arm into useful energy while simultaneously stopping movement of the falling work lever.

The hydraulic piston is akin to the egg analogy in the sense that, as described above, when you let your hand "give" and extend the amount of time it takes to "absorb the momentum", the egg extends a smaller force on your hand. Likewise, as the falling work lever engages the top of the extended piston rod located near the horizontal position, for a period of time, the torque exerts a smaller magnitude of force on the piston as it absorbs the momentum and compresses the piston rod.

The magnitude of forces generated for energy conversion by the water motor 10 increases exponentially with decreasing engagement height (relative to the fulcrum), a shorter piston rod as mentioned above would be an example. The increase in magnitude of force is due to the gravitational acceleration of the falling work lever end and longer freefall time before engagement with piston head. Although the magnitude of force significantly increases by reducing the downward travel distance of the power stroke, the time (t) of engagement is also reduced (Ft=mv).

Other insights pertaining to the present invention are presented hereinafter.

A weighted working lever arm and resolving energy output can be increased with additional weight capacity of container 16 and 17, and additional magnetic force of magnets 32 and 33. The applied torque has increased as the center of gravity of the filled and raised water container 16 or 17 approaches the distal end of the working lever arm.

Perpendicular leverage is an improvement that can be applied to the working lever arm 28 as a means to amplify force and energy output without increasing flow by using secondary perpendicular leverage and splitting flow from the distal ends of the tipping lever arm 11 and discharging into two containers separated by a separate distance which further amplifies force on the distal end of the primary working lever 28. This approach requires a secondary work lever be respectively balanced and secured on the primary work lever arm 28 at its distal end. Two storage containers respectively are located on top of both distal ends of the secondary work lever arm. This approach is analogous to a human being transporting two equally weighted containers (liquid or solid) on a pole, whereby one container is located at each distal end of the pole that is balanced on the person's shoulder or back.

Water discharge from the tipping lever arm 11 is evenly split so as to simultaneously fill multiple containers 16 and 17 located on the distal ends of the perpendicular secondary lever, the center container being removed. Additional torque is applied from the center of the perpendicular secondary working lever arm on to the distal end of the primary work lever arm 28. This torque provided by the water motor is amplified by leverage exerted from secondary perpendicular work lever arms in which the weight loads are located on its distal ends. As energy output increases, opposing force requirements for the magnetic arm holder also increase, although the flow rate does not.

The amount of work produced can be increased by increasing the force (f) or volume (weight capacity) of containers 16 and 17, the force required by the lever arm holder magnets 32 and 33 (FIGS. 5-8) is a direct function of the volume capacity in height of the raised containers 16 and 17. For example, the weight of water in a circular containment vessel can be increased exponentially by increasing its diameter without increasing vessel height. However, additional magnetic forces is required to temporarily maintain the position of the full raised container 16 or 17 with expanded capacity.

The container height is directly related to the tipping lever arm 11, such that the tipping arm 11 when in the lowered position must be in a higher position than the height of the top of receiving container 16 and 17 (FIG. 5).

Finally, the rate at which the torque can be created is a function of the flow rate into the raised container 16 or 17 from the tipping lever arm 11. The power generation by the lever forces of containers 16 and 17 is maximized when the centroid of weight (or effort) loads are located at or near to the distal end.

I claim:

1. A water motor comprising:
a tubular tipping lever arm having open ends, a central water fill port and a central fulcrum pivotally supporting said tubular tipping lever arm for seesaw tipping thereabout;
a container positioned under each open end of said lever arm to receive water flowing from a respective one of said open ends;
a drain valve in each container for respectively draining water from said containers, said containers mounted respectively to opposite ends of a work lever arm having a central fulcrum supporting said work lever arm for seesaw rocking thereabout to alternately position said containers at upper and lower height positions;
drain activation members engaging said drain valves for opening a respective one of said drain valves when a corresponding respective one of said containers is at the lower height position to drain said respective one of said containers;
a directional flow control lever arm rigidly secured to and extending downward from said tipping lever arm and having a distal end protruding between two spaced lever control stops, the spacial relationship between said distal end of said directional flow control lever arm and said spaced lever control stops arranged and dimensioned for cyclical engagement therebetween to thereby cyclically reverse the seesaw tipping, and thereby the flow direction, of said tipping lever arm with resultant cyclical draining of said containers at their lower height positions with the engagement of said directional flow control lever with one of said lever control stops.

2. The water motor of claim 1, wherein said spaced lever control stops are secured to and extend upwardly from said work lever arm.

3. The water motor of claim 1, wherein said drain activation members consist of upwardly extending protrusions positioned under said containers and dimensioned and aligned for respectively engaging said drain valves to open said drain valves when said respective one of said containers in the lower height position.

4. The water motor of claim 1, wherein said directional flow control lever extends centrally downward from said tipping lever arm.

5. The water motor of claim 1, wherein a work load is connected to said work lever.

6. The water motor of claim 1, including a pair of magnetic lever arm holders respectively positioned adjacent to said containers when said containers are at the lower height position for alternately magnetically holding said containers at the lower height position with a predetermined magnetic force.

7. The water motor of claim 1, wherein the open ends of said tubular lever arm are provided with bottom dam walls.

8. The water motor of claim 1, wherein said downwardly extending flow control lever arm contains a counterweight.

* * * * *